United States Patent [19]

Tanaka et al.

[11] Patent Number: 4,734,936
[45] Date of Patent: Mar. 29, 1988

[54] RINGING SIGNAL SENDING-OUT CIRCUIT

[75] Inventors: Jouji Tanaka, Kawasaki; Yoshiji Tanimoto; Masaaki Saito, both of Tokyo, all of Japan

[73] Assignees: Nitsuko Limited; Nippon Telegraph and Telephone Corporation, both of Tokyo, Japan

[21] Appl. No.: 798,237

[22] Filed: Nov. 14, 1985

[30] Foreign Application Priority Data

Nov. 15, 1984 [JP] Japan .................................. 59-239388

[51] Int. Cl.$^4$ ............................................ H04M 3/02
[52] U.S. Cl. ..................................... 379/253; 379/418
[58] Field of Search .......... 179/18 HB, 51 AA, 84 R, 179/84 A; 379/418, 361, 255, 253, 252, 254

[56] References Cited

U.S. PATENT DOCUMENTS 4,220,826 9/1980 Kiss ................................ 179/18 HB

FOREIGN PATENT DOCUMENTS 136414 11/1978 Japan .................................. 379/255

Primary Examiner—James L. Dwyer
Attorney, Agent, or Firm—Frishauf, Holtz, Goodman & Woodward

[57] ABSTRACT

A circuit for sending out a ringing signal of a high voltage and a low frequency to a telephone set through a telephone line repeatedly with a predetermined time interval. In order to omit use of a high power oscillator and relays, a D.C. power supply of a high voltage is operatively connected to the telephone line through phototransistors of photocouplers being driven by a pulse signal having a low voltage and the low frequency under control of pulses occurring at the predetermined time intervals so that the ringing signal is sent out to the telephone set repeatedly with the predetermined time interval.

6 Claims, 3 Drawing Figures 4,734,936

RINGING SIGNAL SENDING-OUT CIRCUIT

BACKGROUND OF THE INVENTION

1. Field of the Invention

The present invention relates to a telephone system, and in particular, to a circuit for sending out a ringing signal to a telephone set through a telephone line.

2. Description of the Prior Art

The ringing signal comprises an A.C. signal having a low frequency such as 16 Hz and a comparatively high effective voltage such as 75V and being sent out repeatedly for a predetermined time period such as one second with a pause interval such as two seconds.

In the prior art, an oscillator is used for generating the ringing signal and has a comparatively large size because vacuum tubes, a large-sized output transformer and other components are required to generate the ringing signal of such a high voltage and a low frequency. A relay is used to send out the oscillator's output to the telephone line repeatedly with the pause intervals. Spark unadvantageously generates at the relay contacts opening and closing.

SUMMARY OF THE INVENTION

It is an object of the present invention to provide a small-sized ringing signal sending-out circuit.

It is another object of the present invention to provide a ringing signal sending-out circuit wherein no relay is used to control the ringing signal to be sent out to the telephone line, so that no spark is caused.

According to the present invention, a ringing signal sending-out circuit for sending out the ringing signal having a high voltage and a predetermined low frequency to a telephone set through a telephone line repeatedly with a predetermined time interval can be obtained which comprises a D.C. power supply means for providing a D.C. output of a predetermined high voltage, and connecting circuit means for operatively connecting the D.C. power supply means to the telephone line and comprising a first photocoupler. The first photocoupler comprises a light emission diode and a phototransistor photocoupled thereto. A pulse oscillator means oscillates a low voltage pulse signal having the predetermined low frequency. The low voltage pulse signal is supplied to the light emission diode repeatedly with the predetermined time interval by control of photocoupler driving means. Therefore, the low voltage pulse signal of the predetermined low frequency is sent out to the telephone set repeatedly with the predetermined time interval.

In an aspect of the present invention, the telephone line comprises a first and a second conductor. The D.C. power supply means has a positive output terminal and a negative output terminal. The positive output terminal is connected to the first conductor through the phototransistor, and the negative output terminal is connected to the second conductor.

In another aspect, the photocoupler driving means comprises a pulse generator means for generating pulses repeatedly with the predetermined time interval, and gate circuit means for controlling the supply of the low voltage pulse signal from the pulse oscillator means to the light emission diode in response to the pulses from the pulse generator means.

The connecting circuit means may have a second photocoupler having a light emission diode and a phototransistor photocoupled thereto. The negative output terminal of the D.C. power supply means is connected to the second conductor through the phototransistor of the second photocoupler. The light emission diode of the second photocoupler is driven by the pulses from the pulse generator means.

For a telephone set having a blocking capacitor through which a ringing tone generator is connected to the first and second conductors, the ringing signal sending-out circuit further comprises a discharge circuit being connected to the first and second conductors for discharging the capacitor during a time period when the phototransistor of the first photocoupler turns off.

The discharge circuit comprises a resistor and a phototransistor of a third photocoupler connected in series with the resistor. A light emission diode of the third photocoupler is driven by an inverted pulse signal of the pulse signal supplied to the light emission diode of the first photocoupler.

Further objects, features and other aspects will be understood from the following detailed description of preferred embodiment of the present invention with reference to the accompanying drawings.

DETAILED DESCRIPTION OF PREFERRED EMBODIMENTS

Prior to description of embodiments of the present invention, a description will be made as to a known ringing signal sending-out circuit used in a key telephone system.

Figure 1:
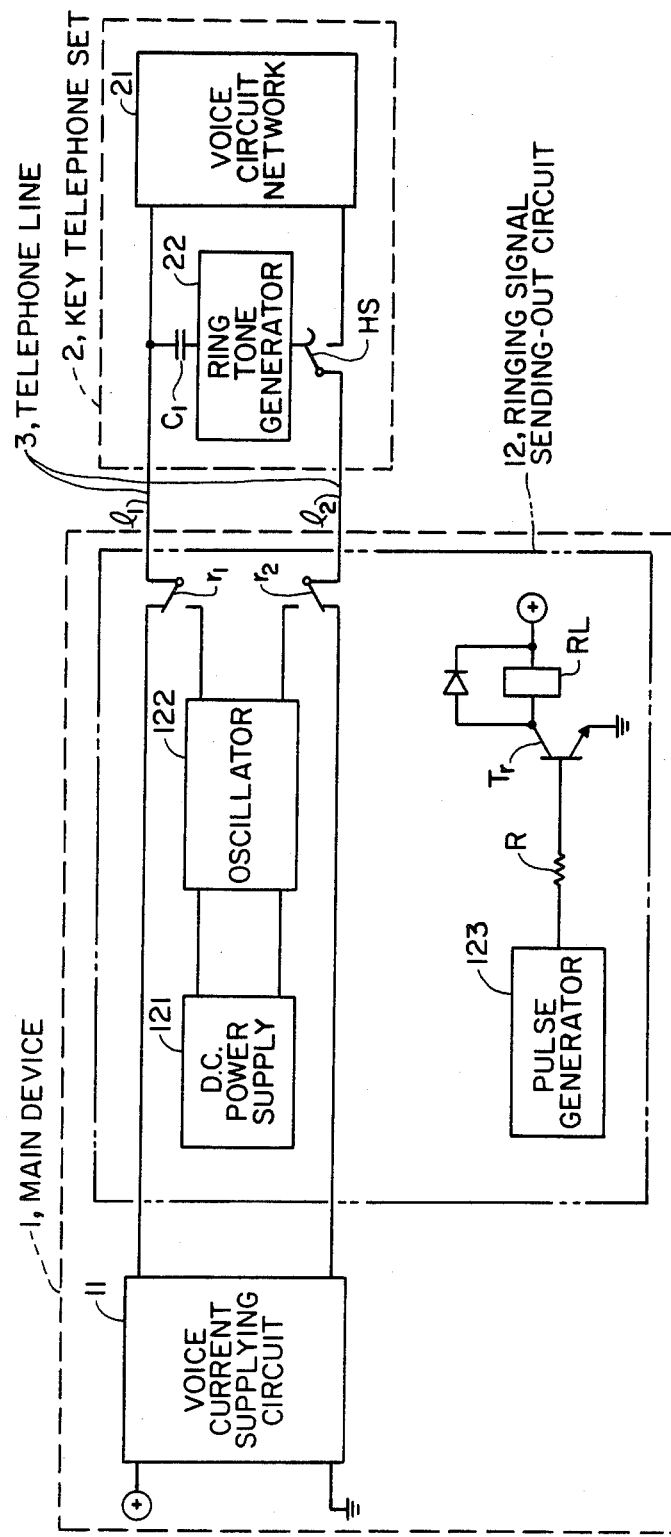
FIG. 1 is a block diagram view of a known ringing signal sending-out circuit used in a key telephone system.

Referring to FIG. 1, a key telephone system comprises a main device 1 and a plurality of key telephone sets, one of which is shown at 2 in FIG. 1. The key telephone set 2 is connected to main device 1 through a telephone line 3 comprising two conductors $l_1$ and $l_2$.

The main device 1 includes a voice current supply circuit 11, which is connected to the conductors $l_1$ and $l_2$ of telephone line 3 through break contacts $r_1$ and $r_2$ of a relay RL, and a circuit 12 for sending out a ringing signal.

The ringing signal sending-out circuit 12 comprises a D.C. power supply 121 providing a D.C. power of a comparatively high voltage of, such as 24V to an oscillator 122. The oscillator 122 generates an A.C. signal of a predetermined low frequency of, such as 16 Hz. The A.C. signal is sent out to the telephone line 3 as the ringing signal with predetermined time intervals, for example, two seconds intervals, through make contacts $r_1$ and $r_2$ of relay RL. Each time period for sending out the A.C. signal is a constant time, such as, one second.

In order to control the relay RL, the ringing signal sending-out circuit 12 further comprises a pulse generator 123 and a relay control circuit.

The pulse generator 123 starts by a start signal from a call detecting circuit (not shown) in main device 1, and generates pulses. Each pulse has a pulse width of one second and an interval between adjacent two pulses is two seconds.

The relay control circuit comprises a transistor Tr and a resistor R. The relay RL is connected to a D.C. power (not shown) through transistor Tr. The pulse signal from pulse generator 123 is applied to transistor Tr through resistor R and periodically makes the transistor Tr conductive. When transistor Tr turns on, the relay RL is operated.

Thus, the ringing signal is sent out to the telephone line 3 periodically.

The telephone set 2 comprises a voice circuit network 21 connected to the telephone line 3 through a hook switch HS, and a ringing tone generator 22 connected to the telephone line 3 through a blocking capacitor $C_1$ and a break contact of the hook switch HS.

The incoming ringing signal flows through ringing tone generator 22 during an on-hook condition, and the generator 22 generates a ringing tone. When an off-hook condition is caused by lifting up a handset (not shown), the voice circuit network 21 is connected to the telephone line 3 through a make contact of the hook switch HS.

In the above-described known ringing signal sending-out circuit, large-sized transformer and vacuum tubes are required to arrange the oscillator 122 which generates a low frequency signal of a comparatively high effective voltage of, for example, 75V. Therefore, the oscillator is large in volume and is high in cost.

Furthermore, since the output signal of the oscillator 122 is periodically applied to the telephone line 3 by turning-on and -off operation of the relay contacts $r_1$ and $r_2$, an electric spark is caused at each relay contacts. The electric spark not only shortens the life time of the relay contacts and causes noise for peripheral electric and electronic equipments.

The present invention solves those problems in the known ringing signal sending-out circuit.

Figure 2:
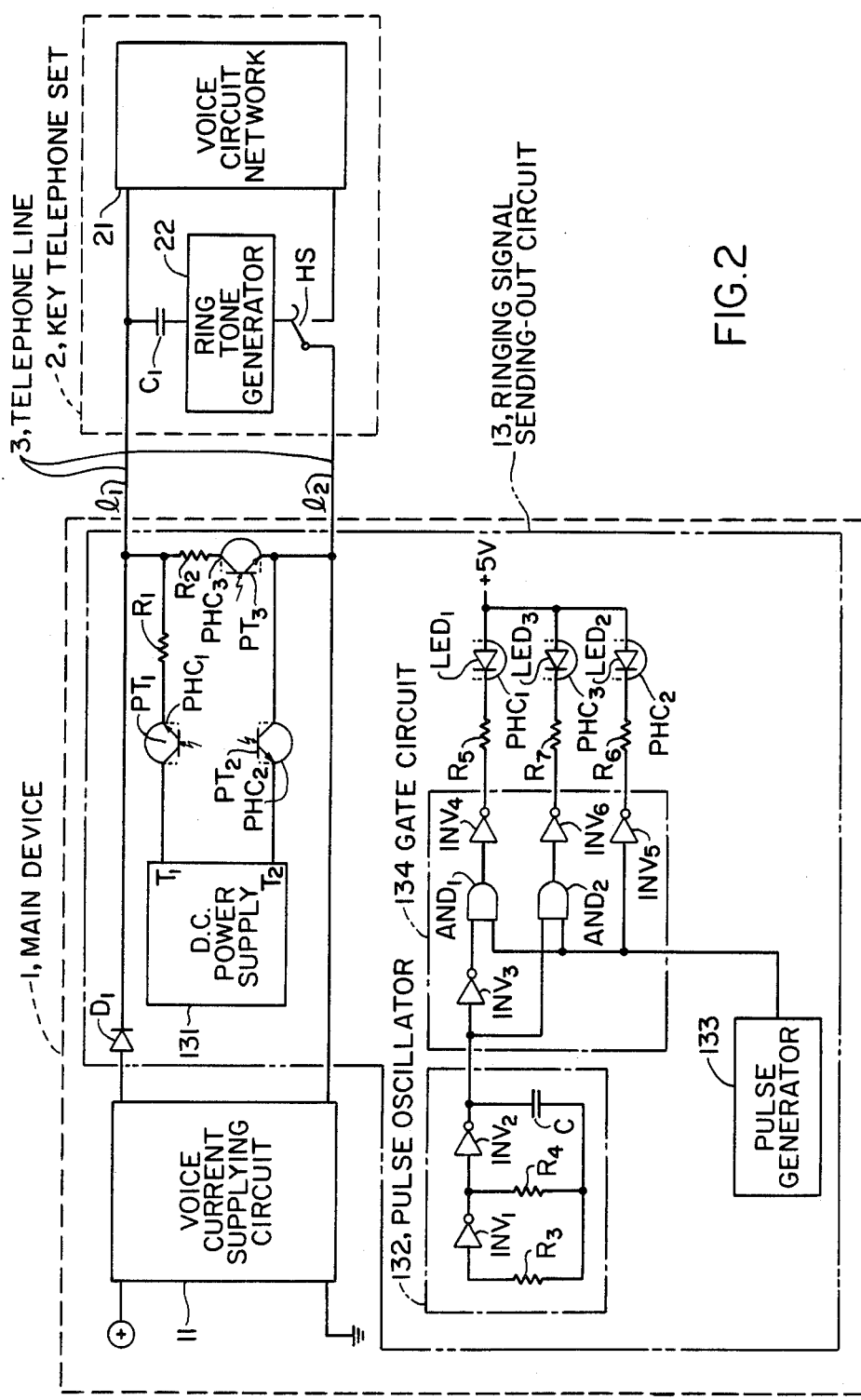
FIG. 2 is a block diagram view of a ringing signal sending-out circuit according to an embodiment of the present invention, which is used in a key telephone system.

Referring to FIG. 2, a key telephone system is shown therein similar to FIG. 1, but has a ringing signal sending-out circuit 13 according to an embodiment of the present invention. Similar parts are represented by the same reference characters as in FIG. 1, and detailed description thereto is omitted for the purpose of simplification of the description.

The ringing signal sending-out circuit 13 comprises a D.C. power supply 131 similar to power supply 121 in FIG. 1 but providing a D.C. power of a higher voltage of 140V. A positive terminal $T_1$ of the D.C. power supply 131 is connected to conductor $l_1$ of the telephone line 3 through a phototransistor $PT_1$ of a first photocoupler $PHC_1$ and a resistor $R_1$, while a negative terminal $T_2$ being connected to conductor $l_2$ of the telephone line 3 through a second phototransistor $PT_2$ of a second photocoupler $PHC_2$.

The D.C. output of D.C. power supply 131 is periodically sent out to the telephone line 3 as the ringing signal by control of the first and second photocouplers $PHC_1$ and $PHC_2$ as described hereinafter.

A diode $D_1$ is used for preventing the D.C. current to flow into voice current supplying circuit 11 from D.C. power supply 131 through conducted phototransistor $PT_1$ and resistor $R_1$.

Figure 3:
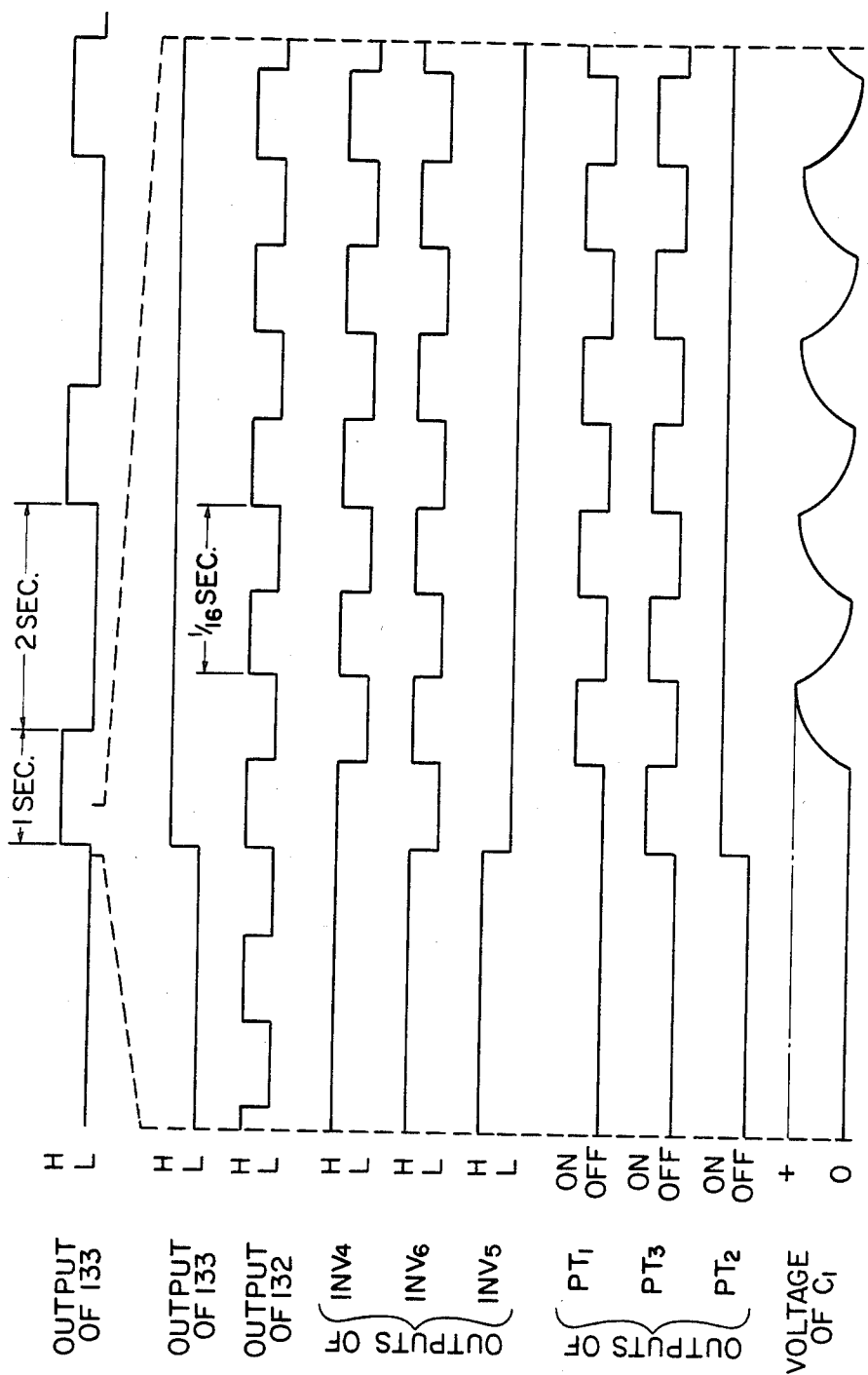
FIG. 3 is a view illustrating waveforms of signals on various points in the circuit of FIG. 2.

Since the D.C. current flows through the conducted phototransistor $PT_1$ and resistor $R_1$, and charges blocking capacitor $C_1$ in key telephone set 2 through telephone line 3, a series circuit of a phototransistor $PT_3$ of a third photocoupler $PHC_3$ and a resistor $R_2$ is connected to bridge the conductors $l_1$ and $l_2$ so as to discharge the capacitor $C_1$ periodically, as shown in FIG. 3. The third photocoupler $PHC_3$ is also controlled as described hereinafter.

The ringing signal sending-out circuit 13 further comprises a pulse oscillator 132. The pulse oscillator 132 oscillates a pulse signal of a predetermined low frequency, such as 16 HZ, equal to the ringing signal in FIG. 1, as shown in FIG. 3. The pulse signal is not required to have such a high voltage as 75V obtained from oscillator 122 in FIG. 1, but has a very low voltage. Therefore, the pulse oscillator 132 does not require to use large-sized transformers and vacuum tubes, but is composed by two inverters $INV_1$ and $INV_2$, resistors $R_3$ and $R_4$, and a capacitor $C_2$, as shown in the figure. Therefore, the pulse oscillator 132 can be formed in a small-sized circuit device.

The ringing signal sending-out circuit 13 further comprises a pulse generator 133 similar to pulse generator 123 in FIG. 1. The pulse generator 133 generates pulses, each pulse having a predetermined pulse width such as one second, at pause intervals, each interval being, for example, two seconds, as shown in FIG. 3.

Those pulse signals from pulse oscillator 132 and pulse generator 133 are processed at a photocoupler control circuit 134 and processed signals are applied to light emission diodes $LED_1$–$LED_3$ of photocouplers $PHC_1$–$PHC_3$ through resistors $R_5$–$R_7$.

The photocoupler control circuit 134 is a gate circuit which comprises two AND circuits $AND_1$ and $AND_2$ and four inverter circuits $INV_3$–$INV_6$.

The output signal from pulse oscillator 132 is applied to an inverter $INV_3$ and one input terminal of an AND circuit $AND_2$. The output pulse signal from pulse generator 133 is applied to one input terminal of AND circuit $AND_1$, the other input terminal of AND circuit $AND_2$, and inverter $INV_5$. The outputs of AND circuits $AND_1$ and $AND_2$ are applied to inverters $INV_4$ and $INV_6$, respectively.

The outputs of inverters $INV_4$–$INV_6$ are at a high level (H) at a time when the pulse generator 133 is not operated, as shown in FIG. 3.

When the pulse generator 133 is operated, the output of inverter $INV_5$ is at a low level (L) only at a pulse duration of each pulse from pulse generator 133, as shown in FIG. 3.

Within each pulse duration from pulse generator 133, the output of inverter $INV_4$ is at a low level (L) in response to each time period between subsequent pulses from pulse oscillator 132, and the output of inverter $INV_4$ is at a high level (H) in the other condition, as shown in FIG. 3. The output of inverter $INV_6$ is at a low level (L) in response to pulse occurrences from pulse oscillator 132 within each pulse duration from pulse generator 133, and is a high level (H) in the other condition, as shown in FIG. 3.

The output terminals of inverters $INV_4$–$INV_6$ are connected to cathodes of light emission diodes $LED_1$–$LED_3$ of photocouplers $PHC_1$–$PHC_3$ through resistors $R_5$–$R_7$, respectively. The anodes of the light emission diodes $LED_1$–$LED_3$ are connected to a positive terminal of a D.C. power supply circuit providing a low D.C. output voltage such as 5V.

Therefore, the light emission diodes $LED_1$–$LED_3$ illuminate in response to low level outputs of inverters $INV_4$–$INV_6$, respectively. As a result, the phototransistors $PT_1$–$PT_3$ turn on in response to low level outputs of inverters $INV_4$–$INV_6$, respectively, as shown in FIG. 3.

In operation, pulse generator 133 is started by a start pulse from a call detecting circuit (not shown) when the call detecting circuit detects a calling signal incoming from an office line or another telephone line connected to another key telephone set. Therefore, the pulse generator 133 generates the pulse signal comprising pulses of one second pulse width spaced from one another by two seconds pulse intervals, as shown in FIG. 3.

Before pulse generator 133 starts, the outputs of inverters $INV_4$–$INV_6$ are at a high level (H) as described above. Accordingly, light emission diodes $LED_1$–$LED_3$ do not illuminate at all, so that phototransistors $PT_1$–$PT_3$ are maintained an off-condition to break connection of D.C. high power supply 131 to telephone line 3.

The description will be made below in connection with operation of various parts except pulse generator 133 within a short time period in a pulse duration from the pulse generator 133 referring to FIG. 3, wherein the output signals of the various parts are shown in enlarged forms as illustrated by a dashed line.

Since the pulse is inputted to inverter $INV_5$ from pulse generator 133, the output of inverter $INV_5$ is at a low level (L), and the phototransistor $PT_2$ of second photocoupler $PHC_2$ is therefore turned on, as described above. Thus, the negative terminal $T_2$ is connected to conductor $l_2$.

Inverter $INV_4$ alternately provides a high level output and a low level output in synchronization with the pulse signal from pulse oscillator 132, as described above and as shown in FIG. 3. Therefore, light emission diode $LED_1$ of first photocoupler $PHC_1$ illuminates repeatedly at a frequency of 16 Hz, and the phototransistor $PT_1$ turns on repeatedly, as shown in FIG. 3, to connect the terminal $T_1$ of D.C. high power supply 11 to the conductor $l_1$ repeatedly. As a result, a D.C. current of a high voltage is sent out to the telephone line 3 repeatedly at a frequency of 16 Hz.

The inverter $INV_6$ also provides alternately a low level output and a high level output in synchronization with the pulse signal from pulse oscillator 132, but in a different occurrence order from the inverter $INV_4$ as described above and shown in FIG. 3. Therefore, phototransistor $PT_3$ of third photocoupler $PHC_3$ turns on at a time when phototransistor $PT_1$ turns off, and $PT_3$ is off at a time when $PT_1$ is on. Thus, the charge of capacitor $C_1$, which is charged during a time when the phototransistor $PT_1$ is on, is discharged through resistor $R_2$ and the phototransistor $PT_3$ as being turned on, as shown in FIG. 3.

According to the above-described operation of phototransistors $PT_1$–$PT_3$, the ringing signal of 16 Hz are applied to the ringing tone generator 22.

Within a pulse pause interval between subsequent pulses from pulse generator 133, the outputs of inverters $INV_4$–$INV_6$ are at a high level. Therefore, all phototransistors $PT_1$–$PT_3$ are turned off, so that no ringing signal of 16 Hz are supplied to ringing tone generator 22.

Supply of a current of a high voltage to the telephone line are controlled not by relays but by photocouplers, and therefore, the supply control can be carried out without spark.

What is claimed is:

1. A ringing signal sending-out circuit for sending out repeating ringing signals each having a certain duration and a relatively high voltage and a predetermined low frequency to a telephone set through a telephone line with a predetermined time interval between each ringing signal, which circuit comprises:

D.C power supply means for providing a D.C. output of said relatively high voltage, said D.C. power supply means having a positive output terminal and a negative output terminal;

connecting circuit means for operatively connecting said D.C. power supply means to a telephone line having first and second conductors, said connecting circuit means comprising:

a first photocoupler including a first light emission diode and a first phototransistor photocoupled thereto, said positive output terminal being connected to said first conductor of the telephone line through said first phototransistor; and a second photocoupler including a second light emission diode and a second phototransistor photocoupled thereto, said negative output terminal being connected to said second conductor of the telephone line through said second phototransistor;

pulse oscillator means for producing a relatively low voltage pulse signal having said predetermined low frequency of each ringing signal to be produced; and photocoupler driving means coupled to said pulse oscillator means, said photocoupler driving means comprising pulse generator means for generating pulses with said predetermined time interval wherein the duration of each pulse corresponds to said certain duration of each ringing signal, gate circuit means for supplying said low voltage pulse signal from said pulse oscillator means to said first light emission diode of said first photocoupler in response to said pulses from said pulse generator means, and means for supplying said pulses from said pulse generator means to said second light emission diode of said second photocoupler so that a ringing signal is generated and sent out to the telephone line with said predetermined time interval.

2. The ringing signal sending-out circuit of claim 1, further comprising:

a third photocoupler including a third light emission diode and a third phototransistor photocoupled thereto;

said photocoupler driving means further comprising means for producing an inverted pulse signal of said pulse signal supplied to said first light emission diode of said first photocoupler; and said third emission diode of said third photocoupler being coupled to said photocoupler driving means so as to be driven by said inverted pulse signal.

3. The ringing signal sending-out circuit of claim 1, further comprising a discharge circuit coupled to said first and second conductors for discharging a capacitor of a telephone set during a time period when said first phototransistor of said first photocoupler turns off.

4. The combination of a telephone set and a ringing signal sending-out circuit for sending out repeating ring signals each having a certain duration and a relatively high voltage and a predetermined low frequency to a telephone set through a telephone line with a predetermined time between each ringing signal, the ringing signal sending out circuit comprising:

D.C power supply means for providing a D.C. output of said relatively high voltage, said D.C. power supply means having a positive output terminal and a negative output terminal;

connecting circuit means for operatively connecting said D.C. power supply means to a telephone line having first and second conductors, said connecting circuit means comprising:

a first photocoupler including a first light emission diode and a first phototransistor photocoupled thereto, said positive output terminal being connected to said first conductor of the telephone line through said first phototransistor; and a second photocoupler including a second light emission diode and a second phototransistor photocoupled thereto, said negative output terminal being connected to said second conductor of the telephone line through said second phototransistor;

pulse oscillator means for producing a relatively low voltage pulse signal having said predetermined low frequency of each ringing signal to be produced; and photocoupler driving means coupled to said pulse oscillator means, said photocoupler driving means comprising pulse generator means for generating pulses with said predetermined time interval wherein the duration of each pulse corresponds to said certain duration of each ringing signal, gate circuit means for supplying said low voltage pulse signal from said pulse oscillator means to said first light emission diode of said first photocoupler in response to said pulses from said pulse generator means, and means for supplying said pulses from said pulse generator means to said second light emission diode of said second photocoupler so that a ringing signal is generated and sent out to the telephone line with said predetermined time interval; and said telephone set comprising:

a blocking capacitor;

a ringing tone generator coupled to said first and second conductors through said blocking capacitor; and said ringing signal sending-out circuit further comprising a discharge circuit coupled to said first and second conductors for discharging said blocking capacitor during a time period when said first phototransistor of said first photocoupler turns off.

5. The combination of claim 4, wherein said ringing signal sending-out circuit further comprises:

a third photocoupler including a third light emission diode and a third phototransistor photocoupled thereto;

said photocoupler driving means further comprising means for producing an inverted pulse signal of said pulse signal supplied to said first light emission diode of said first photocoupler; and said third light emission doide of said third photocoupler being coupled to said photocoupler driving means so as to be driven by said inverted pulse signal.

6. The combination of claim 5, wherein said discharge circuit further comprises a resistor coupled in series with said third phototransistor of said third photocoupler.

* * * * *